United States Patent [19]
Bauer

[11] 3,836,005
[45] Sept. 17, 1974

[54] DRY CLEANING FILTER ELEMENT ASSEMBLY

[75] Inventor: Richard J. Bauer, Davison, Mich.

[73] Assignee: General Motors Corporation, Detroit, Mich.

[22] Filed: Sept. 13, 1973

[21] Appl. No.: 397,064

[52] U.S. Cl.................. 210/266, 210/282, 210/315, 210/457
[51] Int. Cl........................................... B01d 27/08
[58] Field of Search ............. 210/27, 232, 266, 282, 210/315, 338, 350, 452, 457, 458

[56] References Cited
UNITED STATES PATENTS

| | | | |
|---|---|---|---|
| 2,843,269 | 7/1958 | Dudinec.......................... | 210/457 X |
| 3,189,179 | 6/1965 | McMichael........................ | 210/238 |
| 3,263,812 | 8/1966 | Hartley............................ | 210/266 X |
| 3,730,347 | 5/1973 | Giampalmi, Jr. et al. .......... | 210/266 |

Primary Examiner—Samih N. Zaharna
Assistant Examiner—Robert G. Mukai
Attorney, Agent, or Firm—Frederick M. Ritchie

[57] ABSTRACT

A replaceable filter cartridge for a dry cleaner has concentric sheet metal cylinders and granular carbon held together between the ends of the cartridge by a plastic center tube. The center tube has a continuous plastic screen integrally molded with a grid of plastic ribs. The center tube has an annular shoulder on one end thereof sealingly biasing the outside of one end of the filter cartridge to retain the carbon and a metal ferrule molded into the other end thereof and crimped to the other end of the filter cartridge to lock the filter cartridge in assembled relationship. The center tube is shorter than the sheet metal cylinders so that the dimensional stack-up maintains the center tube in tension to facilitate the sealing bias of the center tube throughout the useful life of the filter cartridge.

9 Claims, 4 Drawing Figures

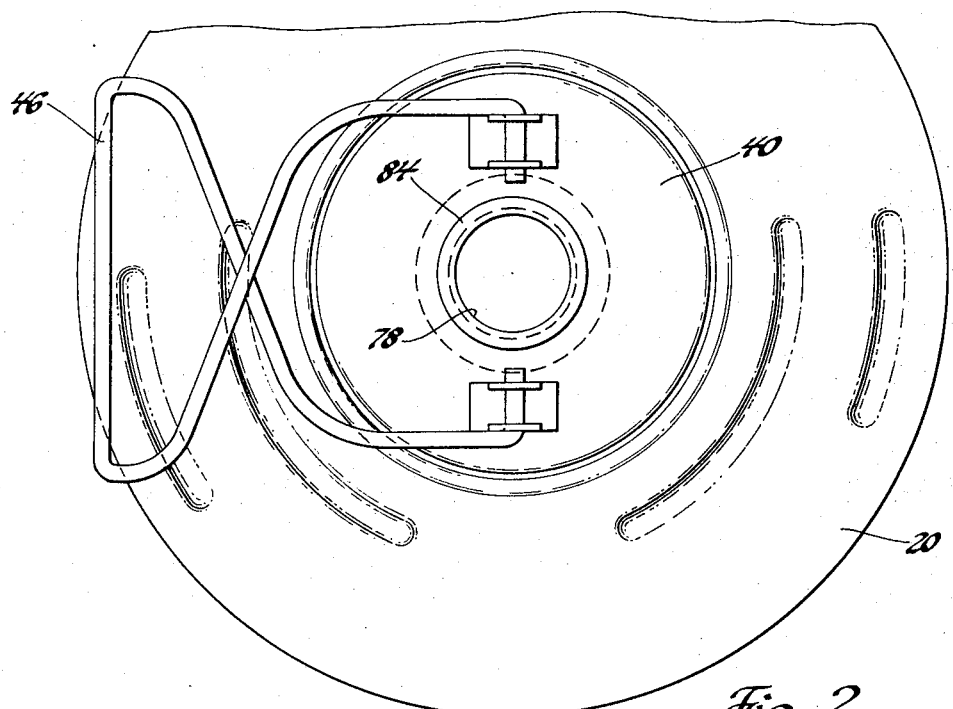
Fig. 2
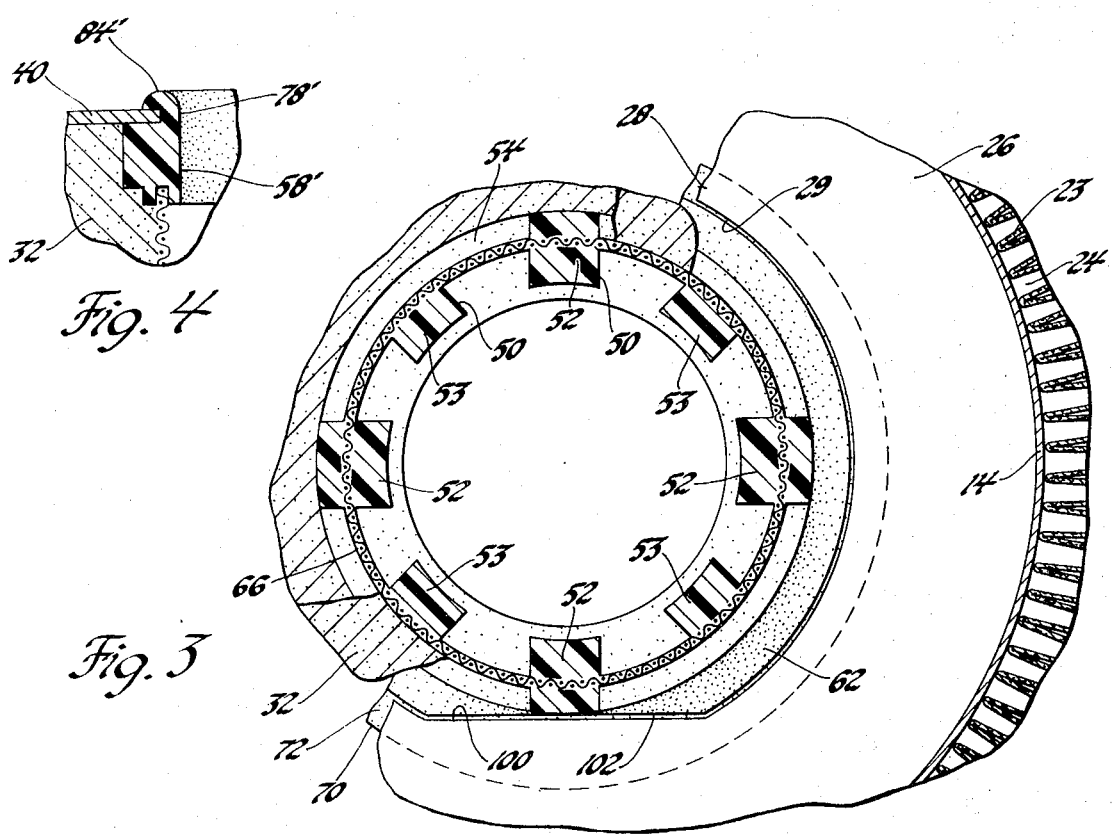
Fig. 4
Fig. 3

DRY CLEANING FILTER ELEMENT ASSEMBLY

This invention relates to dry cleaning apparatus and, more particularly, to an improved filter cartridge for filtering and conditioning dry cleaning solvent.

The prior art discloses a disposable filter cartridge for use with dry cleaning solvent such as that taught in U.S. Pat. No. 3,189,179 issued to J. D. McMichael June 15, 1965. The McMichael patent is representative of a production filter cartridge manufactured and sold by the AC Spark Plug Division of the applicant's assignee.

In the present state of the dry cleaning art, filters use a metal center tube surrounded by a plastic cloth wrapper which is fastened to the center tube on both ends. The wrapper must be formed into a continuous cylinder surrounding the center tube to prevent carbon migration from the filter cartridge. Such continuity in the wrap is provided by sewing or heat seaming the plastic cloth or by using a woven tubular cloth material in the first instance. The problem with this arrangement is that carbon leak paths may develop where the sewing or heat seaming is imperfect.

After the wrap is placed around the center tube, the ends thereof must be fastened tightly to the center tube by such means as plastic locking strips, adhesive tape, tie wires, or embedding the wrapped ends in plastisol. But, in such arrangements, the adhesive on the tapes and plastisols may be attacked by dry cleaning fluids, and carbon leak paths may develop in these areas also. Accordingly, this invention is directed to a dry cleaning filter cartridge which includes an integral plastic center tube to overcome the foregoing disadvantages. More particularly, this invention includes a plastic screen wrapper molded directly into the plastic center tube thereby eliminating the seaming and fastening of the wrap to the center tube. The dimensional stack-up of the filter element assembly and center tube are controlled so that a tight fit always exists between the center tube and the ends of the cartridge.

Accordingly, it is an object of this invention to provide a carbon-filled, sheet metal filter cartridge with a plastic center tube which mechanically locks the sheet metal elements together and seals in the carbon.

A further object of this invention is the provision in a concentric chambered sheet metal filter cartridge of a plastic center tube comprising a plastic grid of intersecting longitudinal and circular ribs integrally molded around and in support relationship to a plastic screen in which the screen has a melting point temperature at least as high as the melting point temperature of the grid.

A further object of this invention is the provision in a carbon-filled sheet metal filter cartridge of a plastic center tube mechanically joining the sheet metal elements of the cartridge and sealing the carbon therein through a biased relationship between the center tube and the end of the cartridge and wherein the plastic center tube is sufficiently short in a longitudinal dimension to maintain the center tube in tension with respect to the sheet metal elements thereby to maintain the bias and, thus, the seal throughout the useful life of the filter cartridge.

Further objects and advantages of the present invention will be apparent from the following description, reference being had to the accompanying drawings wherein preferred embodiments of the present invention are clearly shown.

IN THE DRAWINGS:

FIG. 2 is a fragmentary top elevational view taken along line 2—2 in FIG. 1;

FIG. 3 is a fragmentary sectional view with parts broken away taken along line 3—3 in FIG. 1; and FIG. 4 is a fragmentary side sectional view similar to FIG. 1 with parts broken away to show other means for attaching the center tube to the upper end of the filter cartridge.

Figure 1:
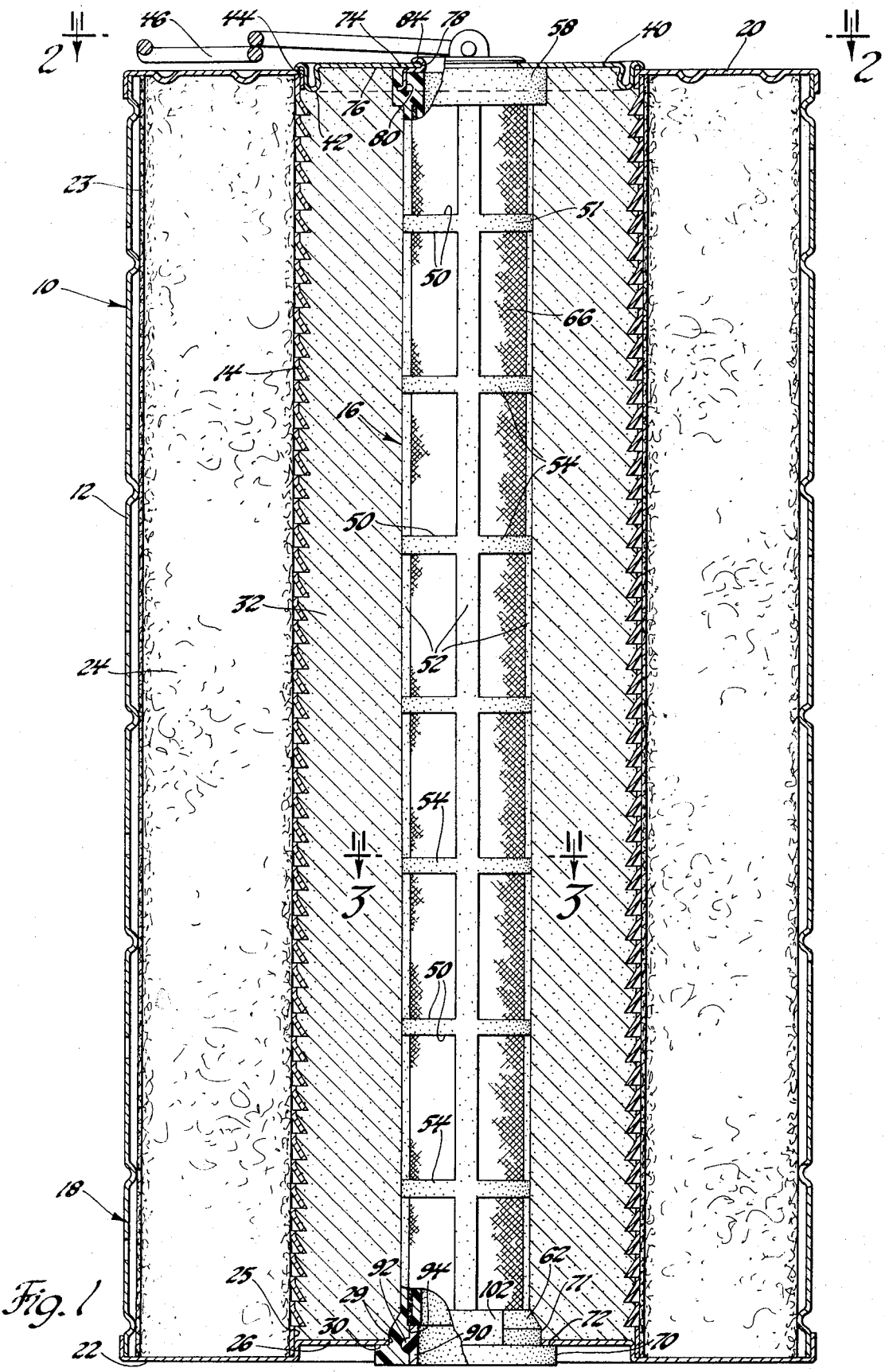
FIG. 1 is a side sectional view of the disposable dry cleaning filter cartridge of this invention.

Turning now to FIG. 1, a dry cleaning filter cartridge 10 is comprised of concentric chamber-forming sheet metal cylinders 12 and 14 mechanically locked together by a plastic center tube 16. More particularly, the cartridge is formed initially by an outer filter assembly 18 which includes the outer perforated shell 12, the inner perforated support tube 14, both of which are held between a pair of annular end plate means 20, 22 to form an annular solvent filtering chamber 24, including filter paper 23, and a center cavity 25.

The lower end plate means 22 includes a central, slightly resilient, sheet metal bulkhead portion 26 having an inner terminal edge 28 (FIG. 3) forming a center opening 29, generally 1.765 inches in diameter, and an outside surface or sealing shoulder 30. Sufficient resiliency is provided in an end plate formed from 0.0187 tin plate steel. The center tube 16 cooperates with bulkhead 26 by extending perpendicularly therefrom to form an annular granular carbon-filled chamber 32 and by sealing the carbon granules and fines therein as will be described more fully hereinafter.

The upper end of the carbon chamber 32, similar to that in the aforementioned McMichael patent, is closed by an upper cover 40 having an edge 42 frictionally engageable with an inner peripheral edge 44 on the upper end plate means 20. A handle 46 may be included for lifting the filter cartridge.

In general, the filter cartridge is mechanically locked together along its longitudinal dimension by the plastic center tube 16 between bulkhead 26 and upper cover 40. More particularly, the plastic center tube 16 is provided with perforations or windows 50 formed by a generally cylindrical plastic grid 51 of intersecting longitudinal ribs 52 and circular ribs 54. The uppermost circular rib 58 and the lowermost rib 62 form the ends of the plastic center tube. Plastic screen 66 is made integral with the center tube as the grid is pressure injection molded about the screen. Screen 66 covers the perforations 50 of the grid such that the longitudinal ribs 52, 53 alternately support said screen on the inside and outside thereof at spaced points around the center tube. Each circular rib 54 supports and adheres to screen 66 on the outside of the screen. Longitudinal ribs 52 actually sandwich the screen. In this way, any longitudinal seam in screen 66 may be completely enclosed in the molded sandwich.

It is important that a seal be maintained between the center tube's uppermost circular rib 58 and upper cover 40 and between the lowermost circular rib 62 and bulkhead 26 to prevent carbon from leaking out of the cartridge at such jointures. For this purpose, rib 62 is provided with an annular flange 70 radially extending from an inner diameter 71 of 1.75 inches to an outer diameter of 2.05 inches, thereby to form a shoulder 72 in abutting relationship with the outside surface of sealing shoulder 30 on bulkhead 26. The uppermost rib 58 includes a shoulder 74 having an outer diameter of 1.70 inches and abutting the inside surface 76 of cover 40 around a 1.15 inch diameter center port in the cover. A metal ferrule 80 is molded into rib 58 and includes a collar 78 having a terminal flange 84 in spunover crimped-on relationship with cover 40. It is also within the purview of this invention to form plastic tube 16 with an uppermost rib 58' (FIG. 4) having an integral thin-walled boss 78' from which a terminal portion 84' is overturned by spin welding into a crimped-on relationship with cover 40.

In some dry cleaning installations, filter cartridge 10 is installed in a filter housing like that shown in U.S. Pat. No. 3,212,641 (Komarmy et al) issued Oct. 19, 1965. The cartridge is sealed in the housing in a manner to close one end of the cartridge and connect the outlet at the other end of the cartridge to the outlet from the filter housing. For this purpose, an insert 90 is snap fastened as at 92 to the inside diameter 94 of rib 62 to adapt the size of this diameter to the size of this outlet from the filter housing. Different size inserts, of course, may be used to accommodate different filter housings.

When filter cartridge 10 is inserted in a filter housing like Komarmy et al's, the handle on the housing cover is twisted to make the proper connection between filter and housing. Such twisting action may tend to rotate center tube 16 relative to the outer filter assembly. To prevent this and maintain the integrity of the carbon seal at bulkhead 26, opening 29 is provided with a single straight edge 100 which keys with a flat 102 on center tube rib 62 to prevent relative rotation between center tube and other filter assembly.

The integrity of the carbon seal between the center tube and bulkhead 26 is also maintained by another feature of this invention. The longitudinal dimension of center tube 16 between shoulder 74 on its upper end and shoulder 72 on its lower end is shorter than the dimensional stack-up of the outer filter assembly. This relative shortness together with the resiliency of bulkhead 26 maintains the center tube under tension to assure a sealing bias between center tube and bulkhead throughout the useful life of the cartridge. A satisfactory sealing bias has been maintained in a cartridge approximately 14 inches long when such center tube dimension is substantially 0.058 inch shorter than the stack-up of the sheet metal parts being joined.

A suitable solvent flow without carbon migration has been provided in filter cartridge 10 where the perforations of the center tube have a net screen area of 33.6 square inches and the porosity of the screen permits a solvent flow of 414 cubic feet per minute. In some dry cleaning installations, filter cartridge 10 will be subjected to backflow of solvent. Accordingly, the screen should have a minimum break strength of 420 pounds per inch for the warp thread and 180 pounds per inch for the fill or woof thread.

It is also important that screen 66 not degrade during use due to solvent temperature. Especially is it important that it not degrade before its supporting grid. Accordingly and in line with another feature of this invention, plastic materials of the same melting point should be used. In the preferred embodiment, nylon plastic is used for both the screen 66 and grid 51. In any event, the melting temperature point of the screen should not be lower than that of the grid.

If screen 66 is not woven in tubular form, the juxtaposed ends of the wrapped fabric should be buried or sandwiched, as aforementioned, in one of the longitudinal ribs 52.

The outer filter assembly 18 is assembled with center tube 16 and upper cover 40 as follows. Rib 58 is inserted through opening 29 in bulkhead 26 by maneuvering the rib past straight edge 100. The center tube 16 is oriented with respect to bulkhead 26 to key straight edge 100 with flat 102 and with shoulder 72 of the center tube abutting the outside surface 30 of the bulkhead. Center tube 16 is maintained perpendicular to bulkhead 26 by a manufacturing fixture while the cavity of chamber 32 is filled with carbon granules. Then, the upper cover 40 is pushed into sealing engagement with the inner peripheral edge 44 on upper end plate 20. At this time, the terminal end 84 of the ferrule will extend as a cylinder through opening 78 in the cover. This cylindrical form is then spun over into the crimped relationship shown in FIG. 1 to complete the filter cartridge.

While the embodiment of the present invention as herein disclosed constitutes a preferred form, it is to be understood that other forms might be adopted.

What is claimed is:

1. A disposable filter cartridge for use with dry cleaning solvent comprising:

means including a perforated cylindrical support tube adapted to receive through the perforations thereof solvent to be conditioned, a perforated center tube concentric with said support tube and having one end open for dispensing conditioned solvent therethrough, the perforations of said center tube formed by a generally cylindrical plastic grid of intersecting longitudinal and circular ribs, the uppermost and lowermost of said circular ribs forming the ends of said center tube, the perforations of said support tube and said center tube being in sequential flow relationship, annular imperforate end plate means at one end of said cartridge connected to said support tube and defining therewith a center cavity open at the other end of said cartridge, said means including said support tube and said end plate means forming an outer filter assembly, said end plate means having a slightly resilient lower bulkhead defining said one end of said center cavity and having an inner terminal edge in the center thereof forming on the outside surface thereof a sealing shoulder and an opening large enough to insertingly pass one end only of said center tube, the other end of said center tube being larger than said opening to prevent said other end from passing through said opening, an annular upper cover sealingly supported by said support tube at the other end of said cartridge for closing the open end of said center cavity, an endless plastic screen molded integral with said center tube and covering the perforations thereof, the plastic of said screen having a melting point temperature at least as high as the melting point temperature of the plastic of said grid, the longitudinal ribs of said grid alternately supporting said screen on the inside and outside thereof at spaced points around said center tube, the circular ribs of said grid supporting said screen on the outside thereof, the lowermost circular rib of said grid forming a first shoulder on one end of said center tube sealingly abutting the outside surface of said lower bulkhead around said terminal edge in a manner to seal said center cavity at said bulkhead when said center tube is generally perpendicular to said bulkhead, the uppermost circular rib of said grid forming a second shoulder on the other end of said center tube abutting the inside surface of said upper cover, activated carbon granules in said conditioning chamber for removing soluble matter from solvent flowing therethrough, and means locking said upper cover to said other end of said center tube when said upper cover is sealingly supported by said support tube, said locking means including a central port in said upper cover and a ferrule molded integral with the uppermost circular rib of said center tube, said ferrule having an annular terminal flange extending longitudinally from said second shoulder and in crimped together relationship with said upper cover around the central port, said center tube having a sufficiently shortened longitudinal dimension between said shoulders relative to said outer filter assembly so that in cooperation with the resilience of said bulkhead said center tube is maintained in tension between the outside surface of said lower bulkhead and the inside surface of said upper cover whereby to facilitate the sealing bias between said lower bulkhead and said first shoulder throughout the useful life of said filter cartridge.

2. The filter cartridge of claim 1 wherein the plastic of said screen and the plastic of said grid have the same melting point.

3. The filter cartridge of claim 2 wherein the plastic of said screen and the plastic of said grid is nylon.

4. The filter cartridge of claim 1 wherein said ferrule is a metal sleeve formed to interlock with said uppermost circular rib as the result of the integral molding therewith.

5. The filter cartridge of claim 1 wherein the plastic screen is made endless by completely enclosing the ends thereof in one of said longitudinal ribs.

6. A disposable filter cartridge for use with dry cleaning solvent comprising:

a perforated cylindrical outer shell adapted to receive through the perforations thereof solvent to be filtered and conditioned, a perforated center tube concentric with said outer shell and having one end open for dispensing filtered and conditioned solvent therethrough, the perforations of said center tube formed by a generally cylindrical plastic grid of intersecting longitudinal and circular ribs, the uppermost and lowermost of said circular ribs forming the ends of said center tube, a perforated sheet metal support tube concentric with said outer shell and said center tube and interposed therebetween in a manner to place the perforations of said outer shell, support tube and center tube in sequential flow relationship, annular imperforate sheet metal end plate means at each end of said cartridge connecting said outer shell and said support tube in spaced relationship respectively along outer and inner peripheral edges of said end plate means to define an annular solvent filtering chamber and a center cavity, a tube of filter paper in said filtering chamber for removing particulate matter from solvent flowing therethrough, said outer shell, said support tube, said end plate means and said tube of filter paper forming an outer filter assembly, one of said end plate means having a slightly resilient lower bulkhead closing one end of said center cavity and having an inner terminal edge in the center thereof forming on the outside surface thereof a sealing shoulder and an opening large enough to insertingly pass one end only of said center tube, the other end of said center tube being larger than said opening to prevent said other end from passing through said opening, an upper cover having an outer edge sealingly engageable with the inner peripheral edge of the other of said end plate means and closing the other end of said center cavity, an endless plastic screen molded integral with said center tube and covering the perforations thereof, the longitudinal ribs of said grid supporting said screen on one side thereof at spaced points around said center tube, the circular ribs of said grid supporting said screen on the other side thereof, the lowermost circular rib of said grid forming a first shoulder on one end of said center tube sealingly abutting the outside surface of said lower bulkhead around said terminal edge in a manner to seal said center cavity at said bulkhead when said center tube is generally perpendicular to said bulkhead, the uppermost circular rib of said grid forming a second shoulder on the other end of said center tube abutting the inside surface of said upper cover, activated carbon granules in said conditioning chamber for removing soluble matter from solvent flowing therethrough, and means locking said upper cover to said other end of said center tube when said upper cover is engaged with the inner peripheral edge of said other of said end plate means, said locking means including a central port in said upper cover and means molded integral with the uppermost circular rib of said center tube and engageable with said upper cover in a manner to seal said upper cover to said uppermost circular rib throughout the useful life of said filter cartridge, said center tube having a sufficiently shortened longitudinal dimension between said shoulders relative to said outer filter assembly that said center tube is maintained in tension between the outside surface of said lower bulkhead and the inside surface of said upper cover whereby to facilitate the sealing bias between said lower bulkhead and said first shoulder throughout the useful life of said filter cartridge.

7. The filter cartridge of claim 6 wherein the one end of said center tube open for dispensing includes a sizing adaptor in snap fastened relation therewith.

8. The filter cartridge of claim 6 wherein the plastic of said screen has a melting point temperature at least as high as the melting point temperature of the plastic of said grid.

9. The filter cartridge of claim 6 wherein said cartridge is substantially 14 inches long and said center tube is substantially 0.058 inch shorter than the stack-up of dimensions joining said outer filter assembly with said upper cover.

* * * * *